United States Patent
Przymusinski et al.

(10) Patent No.: US 7,123,021 B2
(45) Date of Patent: Oct. 17, 2006

(54) METHOD AND DEVICE FOR DIAGNOSIS OF A SENSOR

(75) Inventors: Achim Przymusinski, Lappersdorf (DE); Hartmut Wolpert, Zeitlarn (DE)

(73) Assignee: Siemens Aktiengesellschaft, Munich (DE)

(*) Notice: Subject to any disclaimer, the term of this patent is extended or adjusted under 35 U.S.C. 154(b) by 15 days.

(21) Appl. No.: 10/795,464

(22) Filed: Mar. 8, 2004

(65) Prior Publication Data
US 2004/0168511 A1    Sep. 2, 2004

Related U.S. Application Data
(63) Continuation of application No. PCT/DE02/03227, filed on Sep. 2, 2002.

(30) Foreign Application Priority Data
Sep. 14, 2001 (DE) ............ 101 45 485

(51) Int. Cl.
*G01R 31/02* (2006.01)
(52) U.S. Cl. ............ 324/537; 702/116
(58) Field of Classification Search ......... 324/537; 73/132; 702/116
See application file for complete search history.

(56) References Cited

U.S. PATENT DOCUMENTS

| | | | | |
|---|---|---|---|---|
| 4,337,516 A | * | 6/1982 | Murphy et al. | 701/116 |
| 5,235,527 A | * | 8/1993 | Ogawa et al. | 702/116 |
| 5,394,341 A | * | 2/1995 | Kepner | 324/537 |
| 5,602,732 A | * | 2/1997 | Nichols et al. | 701/29 |
| 5,983,860 A | * | 11/1999 | Kitamura et al. | 123/399 |
| 6,212,461 B1 | * | 4/2001 | Ghoneim et al. | 701/70 |
| 6,345,225 B1 | * | 2/2002 | Bohm et al. | 701/70 |

FOREIGN PATENT DOCUMENTS

| | | |
|---|---|---|
| DE | 42 04 623 A1 | 8/1993 |
| DE | 297 21 751 U1 | 5/1998 |
| DE | 198 55 017 A1 | 5/2000 |
| FR | 2 805 046 A1 | 1/2001 |
| WO | WO 00/04342 | 1/2000 |
| WO | WO 00/48883 A1 * | 8/2000 |

* cited by examiner

*Primary Examiner*—Vincent Q. Nguyen
*Assistant Examiner*—Timothy J. Dole
(74) *Attorney, Agent, or Firm*—Baker Botts L.L.P.

(57) ABSTRACT

In a method for the diagnosis of a sensor, in particular a pedal-travel sensor of a motor vehicle, a first signal (S1) and at least one second equivalent signal (S2) are delivered. If the second signal (S2) is time-delayed with respect to the first signal (S1), at least the previous curve of the first signal (S1) and/or the previous curve of the second signal (S2) is taken into account.

20 Claims, 7 Drawing Sheets

METHOD AND DEVICE FOR DIAGNOSIS OF A SENSOR

CROSS REFERENCE TO RELATED APPLICATION

This application is a continuation of copending International Application No. PCT/DE02/03227 filed Sep. 2, 2002 which designates the United States, and claims priority to German application no. 101 45 485.6 filed Sep. 14, 2001.

TECHNICAL FIELD OF THE INVENTION

The invention relates to a method for diagnosis of a sensor, especially a pedal travel sensor of a motor vehicle which delivers a first signal and at least one second equivalent signal.

DESCRIPTION OF THE RELATED ART

Furthermore the invention relates to a device for diagnosis of a sensor, especially a pedal travel sensor of a motor vehicle which delivers a first signal and at least one second equivalent signal.

Especially in conjunction with sensors used for monitoring devices with safety implications, the provision of sensors which provide two equivalent signals is known. For diagnosis of these types of sensor it is further known that the difference between the two signals delivered by the sensor can be formed and this difference can be compared with a given threshold value. If no error is present this difference is relatively smaller than the specified threshold value so that if the threshold value is exceeded an error can be assumed to have occurred. This known method can however not be applied in all cases in which the two signals are asynchronous since the difference between the two signals in such a case, because of the time delays, can also assume relatively large values in cases where no errors have occurred.

SUMMARY OF THE INVENTION

The object of the invention is to develop the generic method and the generic device in such a way that diagnosis of the sensor is also possible in cases in which the second signal exhibits a time delay relative to the first signal. In such cases the time delay is as a rule not constant.

This object can be achieved by a method for diagnosis of a sensor, especially a sensor for generating pedal travel values for a motor vehicle, comprising the steps of:
  receiving a first signal and at least an equivalent value second signal from the sensor, and
  at least when the second signal exhibits a time delay compared to the first signal, taking into account the previous curve of the first signal and/or the previous curve of the second signal.

The process of taking account of the previous timing curve of the first signal may include determining a rate of change of the first signal. The rate of change of the first signal can be determined by determining the amount of the difference between a first value of the first signal and an earlier second value of the first signal. The process of taking account of the previous timing curve of the second signal may include determining a rate of change of the second signal. The rate of change of the second signal can be determined by determining the amount of the difference between a first value of the second signal and an earlier second value of the second signal. Especially for detection of low frequency faults, the amount of the difference between a value of the first signal and a value of the second signal can be compared with a first threshold value. The first threshold value can be an adaptive threshold value. The adaptation of the first threshold value can be undertaken depending on the rate of change of the first signal and/or depending on the rate of change of the second signal. For adaptation of the first threshold value, the sum of the rate of change maxima determined at different points in time and if necessary of a constant can be determined. Especially for detection of high-frequency faults, a filtered value determined depending on the previous curve of the first signal and/or on the previous curve of the second signal, can be compared with a second threshold value. The second threshold value can be specified as a fixed value. Determining the filtered value may include a process by which a first rate of change sum is determined from a rate of change of the first signal determined at a first point in time and one or more rates of change of the first signal determined before the first point in time. Determining the filtered value may include a process by which a second rate of change sum from a rate of change of the second signal determined at a second point in time and one or more rates of change of the second signal determined before the second point in time. Determining the filtered value may include a process by which the difference between the first rate of change sum and the second rate of change sum is determined. Determining the filtered value may include a process by which the difference between the first rate of change sum and the second rate of change sum is subjected to low pass filtering. Determining the filtered value may include a process by which the amount of the low pass filtered difference between the first rate of change sum and the second rate of change sum is formed.

The object can also be achieved by a device for diagnosis of a sensor, especially a sensor for generating pedal travel values for a motor vehicle, comprising means for receiving a first signal and at least an equivalent value second signal from the sensor, and an evaluation unit for determining whether the second signal exhibits a time delay compared to the first signal, in which case the device takes the previous curve of the first signal and/or the previous curve of the second signal into account.

The object can furthermore be achieved by a device for diagnosis of a sensor, especially a pedal travel sensor of a motor vehicle which delivers a first signal and at least one second equivalent signal wherein at least when the second signal exhibits a time delay compared to the first signal, the device takes account of the previous curve of the first signal and/or the previous curve of the second signal.

The device may further comprise means for determining the first rate of change which determine a rate of change of the first signal, to take account of the previous time curve of the first signal. The first means of determining the rate of change may determine the rate of change of the first signal by determining the amount of the difference from a first value of the first signal and an earlier second value of the first signal. The device may also comprise a second means for determining the rate of change which determined as rate of change of the second signal, to take account of the previous timing curve of the second signal. The second means for determining that rate of change may determine the rate of change of the second signal by determining the amount of the difference between a first value of the second signal and an earlier second value of the second signal. The device may further comprise first comparison means which, especially for detection of low-frequency faults, compares the amount of the difference between a value of the first signal and a value of the second signal with a first threshold value. The device may also comprise threshold value adaptation means which adapt the first threshold value. The threshold adaptation means may adapt the first threshold depending on the rate of change of the first signal and/or depending on the rate of change of the second signal. The means for adapting the threshold value, to adapt the first threshold value, may determine the sum of the different rate of change maxima determined at different points in time and if necessary of a constant. The device may further comprise a second means of comparison which, especially for detection of high-frequency faults, compares a filtered value determined depending on the previous curve of a first signal and/or the previous curve of the second signal with a second threshold value. The device may also comprise means of storing threshold values which specifies the second threshold value as a fixed value. The device may also comprise a first means of summation which, to determine the filtered value, determines a first rate of change sum from a rate of change of the first signal determined at a first point in time and one or more rates of change of the first signal determined before the first point in time. The device may also comprise a second means of summation which, to determine the filtered value, determines a second rate of change sum from a rate of change of the second signal determined at a first point in time and one or more rates of change of the second signal determined before the second point in time. The device may also comprise subtraction means, which, to determine the filtered value, determine the difference between the first rate of change sum and the second rate of change sum. The device may also comprise means of low pass filtering, which, to determine the filtered value, apply low pass filtering to the difference between the first rate of change sum and the second rate of change sum. The device may also comprise means for forming the amount which, to determine the filtered value, determines the amount of the low pass filtered difference between the first rate of change sum and the second rate of change sum.

The method in accordance with the invention builds on the generic prior art such that, at least when the second signal exhibits the time delay relative to the first signal, the previous curve of the first signal and/or the previous curve of the second signal are taken into account. With preferred embodiments of the invention both the previous curve of the first signal and also the previous curve of the second signal are taken into account. If the second signal does not exhibit any time delay relative to the first signal the known method of diagnosis explained at the start can be used in these time segments, whereby just the amount of the difference between the two signals is compared with a given threshold value. The solution in accordance with the invention allows safe diagnosis of the sensor under all operating conditions, in which case it makes no difference whether the time delay is caused as a result of a delayed identification or a delayed transmission of the second signal. For the solution in accordance with the invention it also makes no difference which of the two sensor signals is identified as the first signal or the second signal respectively, so that with a time delay of one of the two sensor signals, in the spirit of the invention, the time-delayed signal is always identified as the second signal.

An especially advantageous development of the method in accordance with the invention provides for the process which takes account of the previous curve of the first signal to determine a rate of change of the first signal. This type of rate of change can in an advantageous way be evaluated by different embodiments of the method in accordance with the invention. For example the rate of change represents a suitable starting variable both for detection of low-frequency faults and detection of high-frequency faults.

In the situation explained in this document there is preferably also provision for the rate of change of the first signal to be determined by determining the amount of the difference in a first value of the first signal and a previous second value of the first signal. In that case a previous sampling step can be used for example as the earlier second value. Naturally the earlier second value can also be more than two sampling steps previously.

With preferred embodiments of the method in accordance with the invention, there is further provision for the process which takes account of the previous timing curve of the second signal to include the process for determining a rate of change of the second signal. The reader is referred to the benefits produced by including the rate of change explained in this document.

In this case there is preferably further provision for determining the rate of change of the second signal by determining the amount of the difference between a first value of the second signal and an earlier second value of the second signal.

In accordance with an especially preferred embodiment of the method in accordance with the invention there is provision, especially for detecting low-frequency faults, for the amount of the difference from one value of the first signal and one value of the second signal to be compared with a first threshold value. Here the conclusion will preferably be drawn that a fault gas occurred if the difference exceeds the specified threshold value.

In this context there is preferably further provision for the first threshold value to be an adaptive threshold value. The use of an adaptive threshold value is advantageous because, as explained at the start, for a time delay of the second signal relative to the first signal the occurrence of relatively large differences does not necessarily give cause to suspect the presence of an error.

In connection with an adaptive first threshold value, a preferred embodiment of the method in accordance with the invention provides for the first threshold value to be adapted, depending on the rate of change of the first signal and/or depending on the rate of change of the second signal. In this case it is preferred that the first threshold value is adapted both depending on the rate of change of the first signal and also depending on the rate of change of the second signal.

This also applies if, in accordance with the preferred embodiment, there is further provision for the sum of the maximum rates of change determined at a different points in time and if necessary a constant to be used to adapt the first threshold value. In this case the constant can be included for example for setting the sensitivity of the diagnosis process or used to take account of permitted tolerances of the sensor.

In addition or as an alternative to detection of low-frequency faults, there is preferably provision with the method in accordance with the invention, that, especially for detection of high-frequency faults, a filtered value determined depending on the previous curve of the first signal and/or of the previous curve of the second signal is compared to a second threshold value. It it is also preferable in this connection that both the previous curve of the first signal and also the previous curve of the second signal are included. Filtering in particular can involve a type of average value creation, especially the creation of sliding averages, in which case more than one filter method can generally be used.

In the situation described here the method in accordance with the invention preferably makes further provision for the second threshold value to be a fixed value. In this case the second threshold value can for example be set for the sensitivity of the diagnosis procedure, especially for high frequency faults.

With preferred embodiments of the method in accordance with the invention there is provision for the process of determining the filtered value to include determining a first rate of change sum from a rate of change determined at a first point in time and one or more rates of change of the first signal determined before the first point in time. In particular if a number of rates of change of the first signal determined before the first point in time are included, this procedure results in formation of sliding average values.

With regard to the evaluation of the second signal, for preferred embodiments the method in accordance with the invention makes provision in a similar way for the process for determining the filtered value to include determining a second rate of change sum from a rate of change of the second signal determined at a second point in time and one or more rates of change of the second signal determined before the second point in time. If necessary the first point in time can coincide with the second point in time.

In this connection further provision can advantageously be made for the determination of the filtered value to include determining the difference between the first rates of change sum and the second rates of change sum. This type of difference already includes very useful information about a possible error state. Depending on the signal curve of the first signal and the second signal high-frequency oscillations can overlay this difference however.

In accordance with a preferred embodiment of the method in accordance with the invention there is thus also provision for the determining of the filtered value to include a process for filtering of the difference between the first rates of change sum and the second rates of change sum. Although the use of a low pass filter is regarded as advantageous, it does not exclude the possibility of being able to use filters with other filter characteristics.

Especially to perform the comparison with a second threshold value already mentioned, there is preferably further provision for the process of determining the filter value to include forming the amount of the low pass filter difference from the first rate of change sum and the second rate of change sum.

Each device which is suitable for executing an embodiment of the method in accordance with the invention falls within to the area of protection of the associated claims.

The device in accordance with the invention for diagnosis of a sensor builds on the generic prior art such that it, at least when the second signal exhibits a time delay relative to the first signal, takes account of the previous curve of the first signal and or the previous curve of the second signal. This produces the advantages explained in conjunction with the method in accordance with the invention in the same or a similar way, with the reader being referred to the corresponding information to avoid repetitions.

The same applies in a similar way for the following preferred embodiments of the device in accordance with the invention, in which case the reader is referred to the corresponding embodiments in conjunction with the procedure in accordance with the invention as regards the benefits achievable by these embodiments.

With preferred embodiments of the device in accordance with the invention there is provision for it to feature first means for determining rates of change to determine a rate of change of the first signal to take account of the previous time curve of the first signal.

In this case a preferred development makes provision for the first means for determining the rate of change to determine the rate of change of the first signal by determining the amount of the difference between a first value of the first signal and an earlier second value of the first signal.

The device in accordance with the invention is advantageously developed in such a way that it features second means for determining the rate of change of a second signal which takes account of the previous curve of the second signal.

In this case there is preferably further provision for the second means of determining the rate of change of the second signal to determine the rate of change in the second signal by determining the amount of the difference between a first value of the second signal and an earlier second value of the second signal.

Similarly to the method in accordance with the invention, there is preferably also provision in conjunction with the device in accordance with the invention for it to feature a first means of comparison which, especially to detect low frequency faults, compares the difference of a first value of the first signal and a value of the second signal with a first threshold value.

In this connection a preferred development of the device in accordance with the invention provides for it to feature threshold value adaptation means which adapt the first threshold value.

In this case it is advantageous to ensure that provision is made for the means of adapting the threshold value to adapt the first threshold value depending on the rate of change of the first signal and/or depending on the rate of change of the second signal.

In this connection it is further preferred that the means for adapting the first threshold value, to adapt the first threshold value determines of the sum of the rate of change maxima determined at different points in time and where necessary of a constant.

In addition or as an alternative to the embodiments specified here of the device in accordance with the invention, provision can be made for it to feature second means of comparison which, especially for detection of high-frequency faults which compare a filtered value determined depending on the previous curve of the first signal and/or the previous curve of the second signal with a second threshold value.

In this connection it is further considered to be advantageous if provision is made with the device in accordance with the invention for it to feature means for storing threshold values which specify the second threshold value as a fixed value.

A similar preferred development of the device in accordance with the invention makes provision for it to feature first summation means for determining the filtered value of a first rate of change sum from a first signal and one or more rates of change of the first signal determined before the first point in time.

As regards the second signal, provision is similarly made in the device in accordance with the invention for it to feature second summation means, which, to determine at the filtered value, determines a second rate of change sum from a rate of change of the second signal determined at a second point in time and one or more rates of change of the second signal determined before the second point in time.

In addition to this it is considered advantageous for the device in accordance with the invention when there is provision for it to feature subtraction means which, to determine the filtered value, determine the difference between the first rate of change sum and the second rate of change sum.

In this connection the device in accordance with the invention is advantageously developed such that it features low pass filtering means which, to determine the filtered value, apply a low pass filtering to the difference of the first rate of change sum and the second rate of change sum.

With the device in accordance with the invention there is preferably further provision for it to feature means for forming amounts which, to determine that the filtered value, determine the amount of the low pass filtered difference between the first rate of change sum and the second rate of change sum.

All means provided in accordance with the invention can be realized partly or completely by suitable analog and/or digital circuit components. With especially preferred embodiments there is provision for the means provided in accordance with the invention to be realized, at least partly, by hardware including one or more CPUs and suitable software.

BRIEF DESCRIPTION OF THE DRAWINGS

The invention is now explained with reference to the enclosed drawings on the basis of preferred embodiments.

The drawings show.

DETAILED DESCRIPTION OF THE PREFERRED EMBODIMENTS

Figure 1:
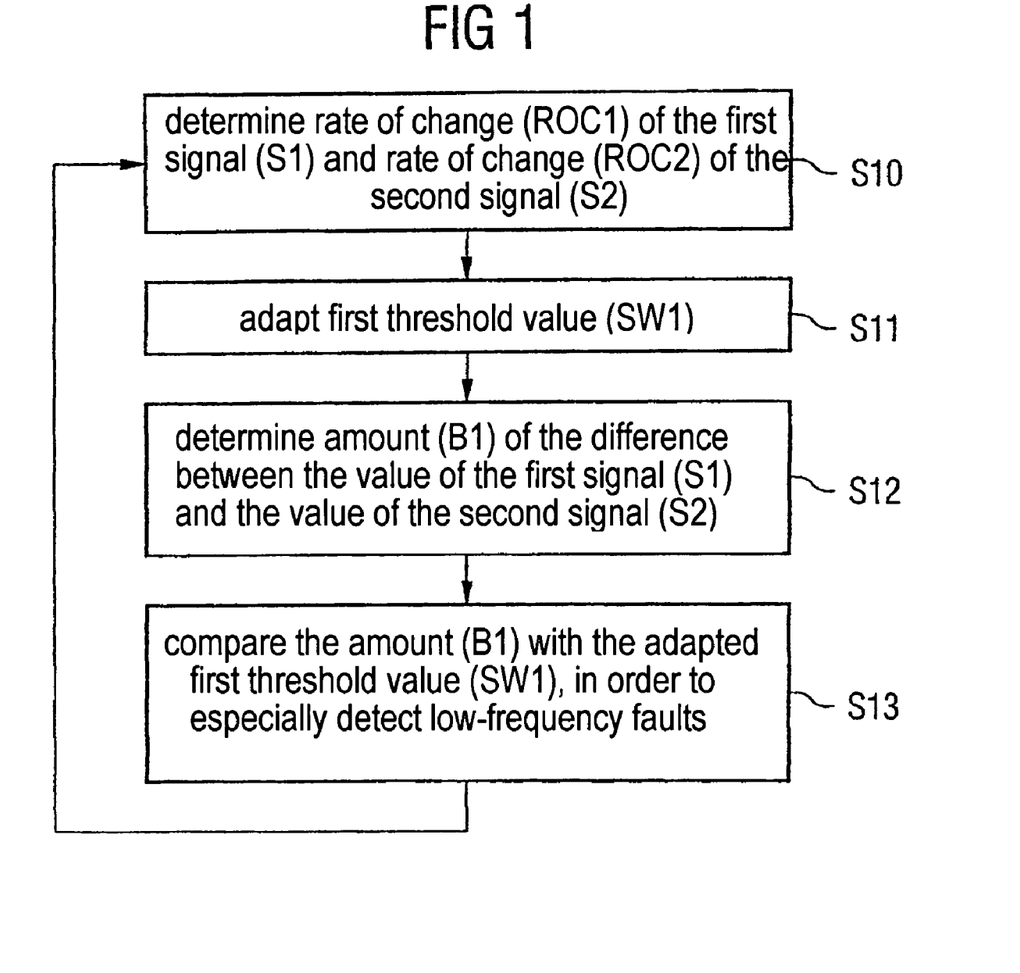
FIG. 1 a flowchart which illustrates an embodiment of the method in accordance with the invention especially suitable for detection of low-frequency faults.

FIG. 1 shows a flowchart which illustrates an embodiment of the method in accordance with the invention especially suitable for detection of low-frequency faults; Step S10 of the flowchart determines the rate of change ROC1 of the first signal S1 and the rate of change ROC2 of the second signal S2. This is preferably done by determining the amount of the difference between a first value S1W1 of the first signal S1 and an earlier second value S1W2 of the first signal S1. The rate of change for the second signal S2 is preferably determined by determining the amount of the difference between a first value S2W1 of the second signal S2 and an earlier second value S2W2 of the second signal S2. In step S11 the first threshold value SW1 is adapted. For this purpose there is preferably provision for the adaptation of the first threshold value SW1 to be undertaken depending on the rate of change ROC1 of the first signal S1 and depending on the rate of change ROC2 of the second signal S2, by determining at the sum of the maximum rates of change MAX1, MAX2, MAX3 and MAX4 determined at the various points in time and of a constant K. Step S12 determines the amount B1 of the difference between the value of the first signal S1 and the value of the second signal S2. Step S13 compares the amount B1 determined in step S12 with the first threshold value SW1 adapted in a step S11. Where the amount B1 exceeds the current first threshold value SW1 the conclusion is that a fault has occurred. The flowchart then branches back to step S10.

Figure 2:
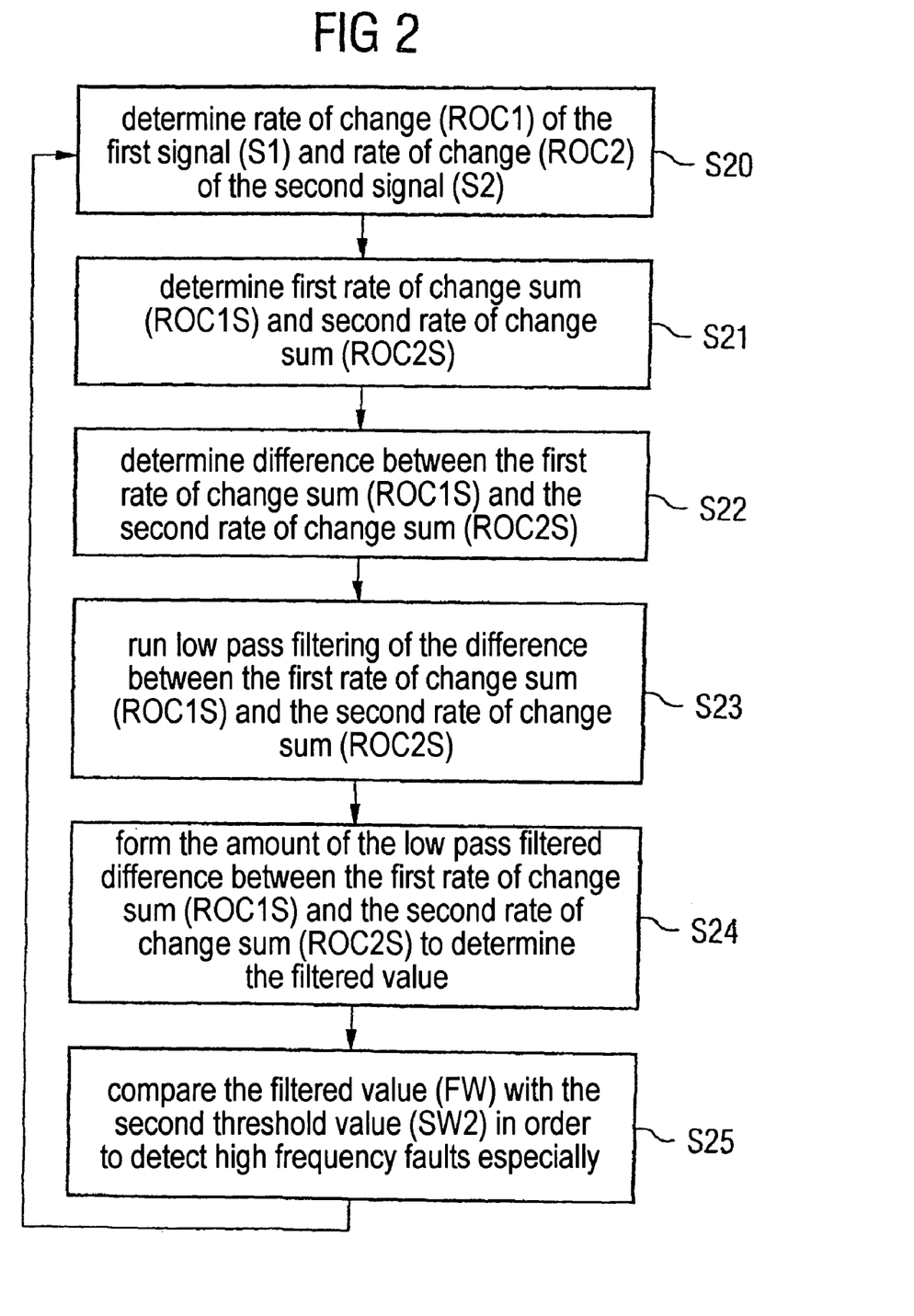
FIG. 2 a flowchart which illustrates an embodiment of the method in accordance with the invention especially suitable for detection of high-frequency faults.

FIG. 2 shows a flowchart which illustrates an embodiment of the method in accordance with the invention especially suitable for detection of high-frequency faults; Step S20 determined the rate of change ROC1 of the first signal S1 and the rate of change ROC2 of the second signal S2 in the way already explained on the basis of FIG. 1. Step S21 determines the first rate of change sum ROC1S and the second rate of change sum ROC2S. In this case the first rate of change sum ROC1S is determined from a rate of change ROC1W1 of the first signal S1 determined at a first point in time and a number of rates of change ROC1W2, ROC1W3, ROC1W4, ROC1W5, ROC1W6, ROC1W7 and ROC1W8 of the first signal S1 determined before the first point in time while the second of rate of change sum ROC2S is determined from a rate of change ROC2W1 of the second signal S2 determined at a second point in time and a number of rates of change R0C2W2, ROC2W3, ROC2W4, R0C2W5, ROC2W6, ROC2W7 and ROC2W8 of the second signal S2 determined before the second point in time. The first point in time and the second point in time can coincide in this case. Step S23 executes low pass filtering of the difference between the first rate of change sum ROC1S and the second rate of change sum ROC2S in order to remove undesired high frequency components from this difference. In step S24 the amount of the low pass filtered difference between first rate of change sum ROC1S and the second rate of change sum ROC2S is formed in order to determine a filtered value FW. Subsequently the filtered value FW is compared in step S25 with a first prespecified second threshold value SW2 in which case a high frequency fault is concluded if the filtered value FW exceeds the second threshold value FW2. Then the flowchart branches back to step S20.

Figure 3:
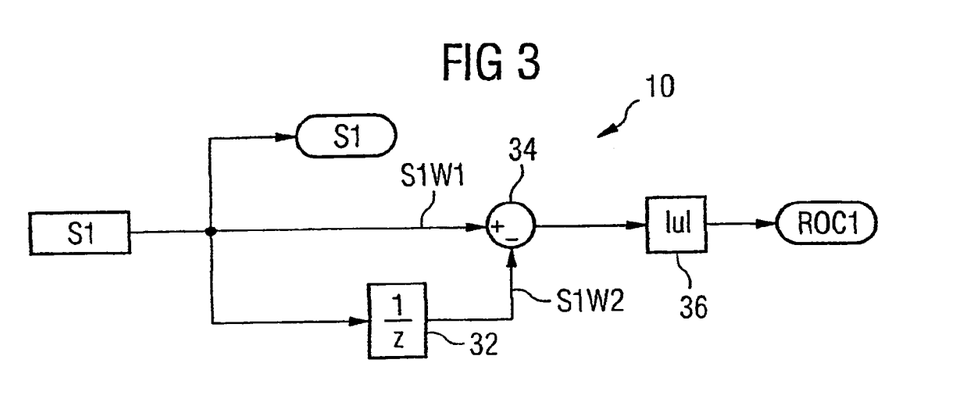
FIG. 3 an embodiment of the first means for determining rates of change preferably provided in the device in accordance of invention.

FIG. 3 shows an embodiment of the first means for determining rates of change preferably provided in the device in accordance of invention. In this diagram subtraction means 34 form the difference between a first value S1W1 of the first signal S1 and an earlier second value S1W2 of the first signal S1 provided by delay means 32. Means for forming the amount 36 generate the amount of this difference and make it available as rate of change ROC1 of the first signal S1.

Figure 4:
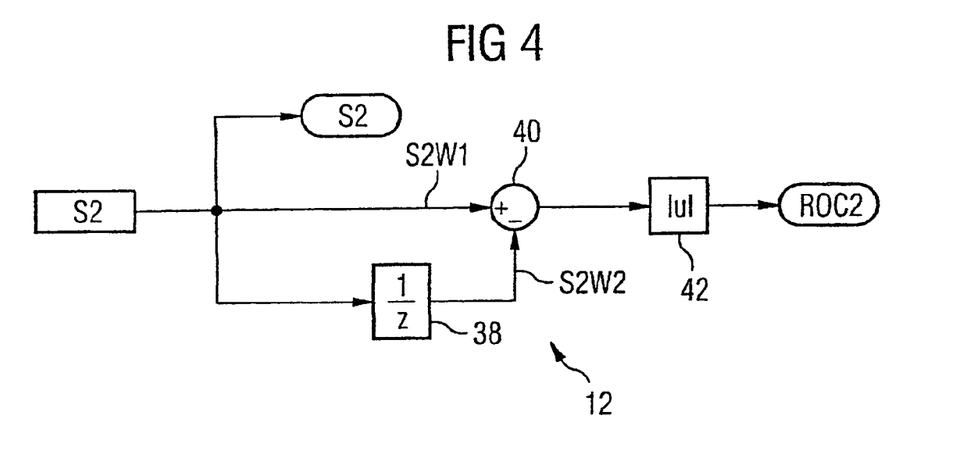
FIG. 4 an embodiment of the second means for determining rates of change preferably provided in the device in accordance of invention.

FIG. 4 shows an embodiment of the second means for determining rates of change preferably provided in the device in accordance of invention. In a similar way to the case shown in FIG. 3, subtraction means 40 form the difference between a first value S2W1 of the second signal S2 and an earlier second value SWS2 of the second signal S2 provided by delay means 38. Means of forming the amount 42 make available the difference as a rate-of-change signal ROC2 of the second signal S2.

Figure 5:
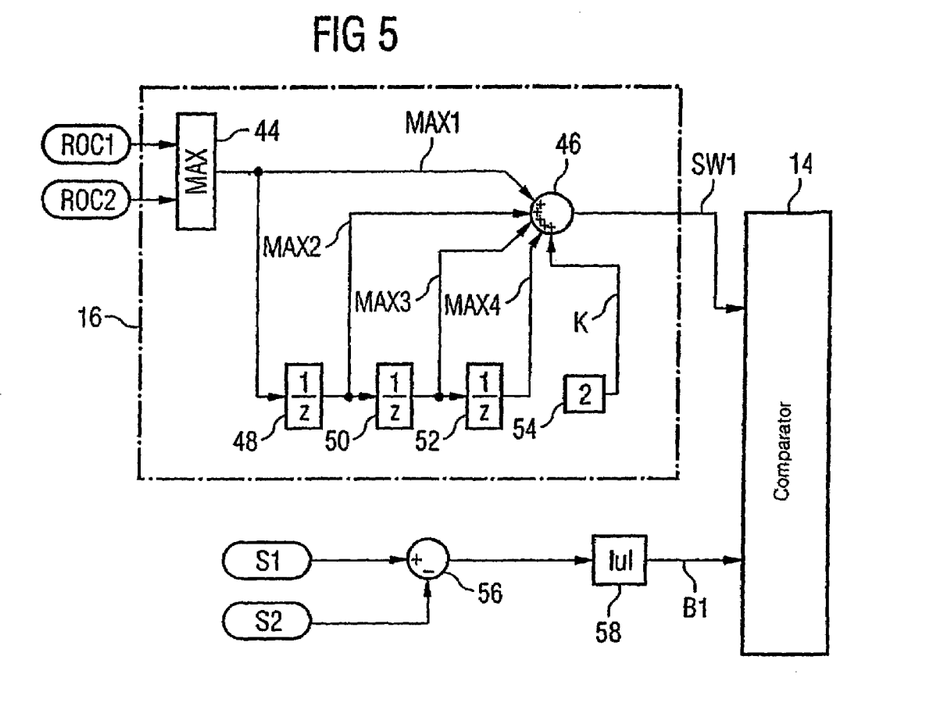
FIG. 5 a part of an embodiment of the device in accordance with the invention especially for detection of low-frequency faults.

FIG. 5 shows part of an embodiment of the device in accordance with the invention especially for detection of low-frequency faults. In this diagram the means of adapting the threshold values designated 16 overall feature means for determining maxima 44 to which the rate of change ROC1 of the first signal S1 and the rate of change ROC2 of the second signal S2 are directed. The means of determining maxima 44 directs the current maximum of the rate of change ROC1 of the first signal S1 and the rate of change ROC2 of the second signal S2 to summation means 46. Furthermore the maxima of the rates of change MAX1, MAX2, MAX3 and MAX4 determined at various points in time and provided by the relevant delay means 48 to 52 are directed to the summation means 46. From these and from a constant K fed in from memory means 54 the summation means 46 determines the current first threshold value SW1 which will be directed to first comparison means 14. The first comparison means 14 compare the first threshold value SW1 with an amount B1 which is determined by the means for forming the amount 58 from a difference between a value of the first signal S1 and value of the second signal S2 provided by a subtraction means 56. Where the first comparison means 14 determines that the amount B1 is larger than the first threshold value SW1 it concludes that there is a fault.

Figure 6:
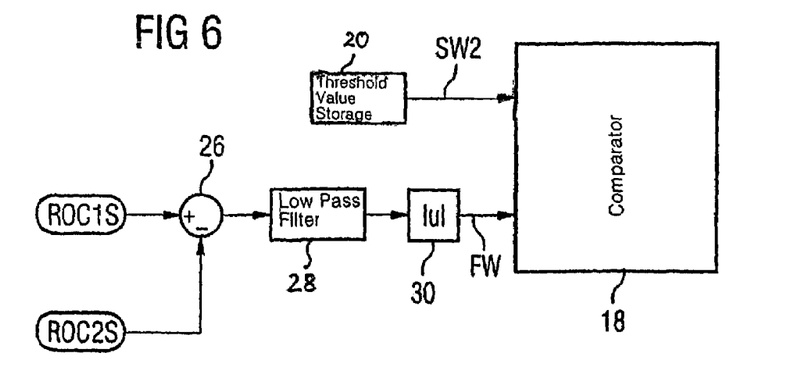
FIG. 6 a part of an embodiment of the device in accordance with the invention especially suitable for detection of high-frequency faults.

FIG. 6 shows a part of an embodiment of the device in accordance with the invention especially suitable for detection of high-frequency faults. In this diagram a first rate of change sum ROC1S and a second rate of change sum ROC2S is fed to a means of subtraction 26 to form the difference between these two rates of change. The first rate of change sum ROC1S and the second rate of change sum ROC2S are determined in this case using the means described below on the basis of FIGS. 7 and 8. The difference determined by the means of subtraction 26 is fed to a low pass filter 28 which filters out undesired high-frequency signal components. The low pass filtered difference between the first rate of change sum ROC1S and the second rate of change sum ROC2S is subsequently fed to amount formation means 30 which delivers a corresponding amount as filtered value FW. The filtered value FW is fed to second comparison means 18 which compares the filtered value FW with a second threshold value SW2 which is fed from threshold value storage means 20. Where the filtered value FW is larger than the second threshold value SW2 the conclusion is that there is a high-frequency fault.

Figure 7:
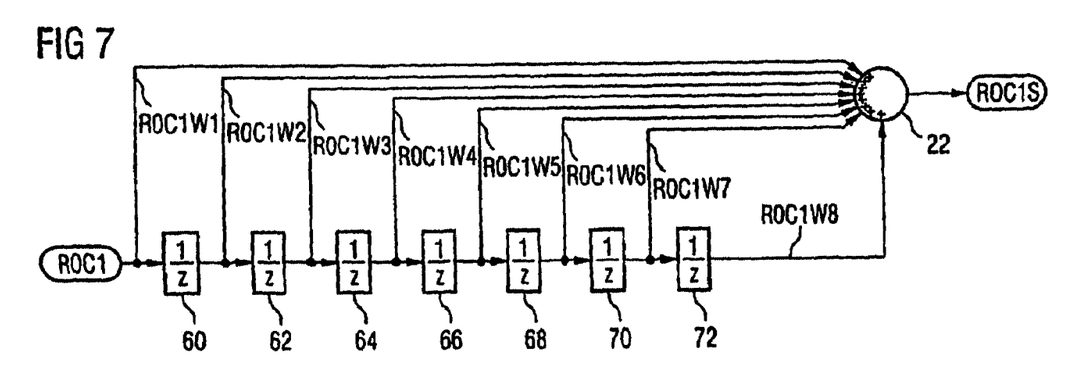
FIG. 7 an embodiment of the first means of summation preferably provided for the device in accordance with the invention.

FIG. 7 shows an embodiment of the first means of summation preferably provided for the device in accordance with the invention. In this diagram a current rate of change ROC1 determined by the means for determining rates of change shown in FIG. 3 is fed to first means of summation 22. Furthermore earlier rates of change ROC1W2, ROC1W3, ROC1W4, ROC1W5, ROC1W6, ROC1W7 and R0C1W8 provided by the relevant delay means 60 to 72 are fed to the first means of summation 22. The first means of summation 22 delivers the first rate of change sum ROC1S, which corresponds to a sliding average.

Figure 8:
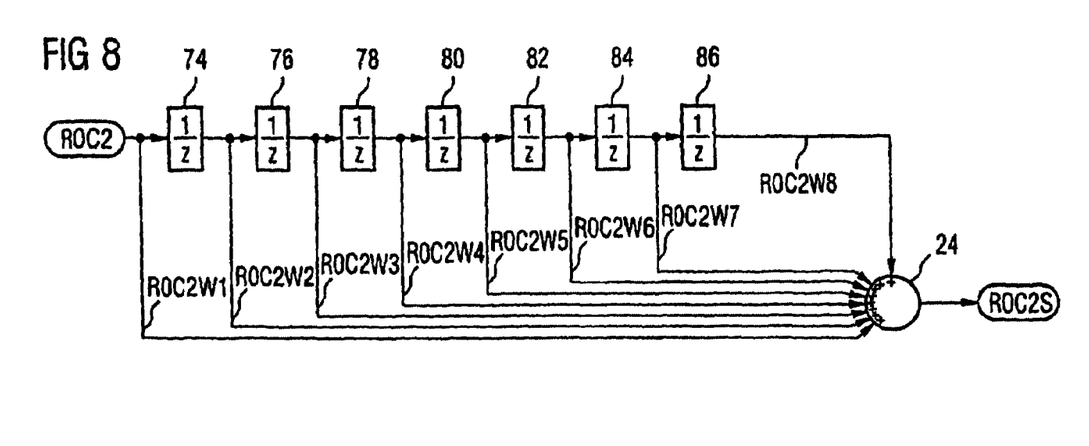
FIG. 8 an embodiment of the second means of summation preferably provided for the device in accordance with the invention.

FIG. 8 shows an embodiment of the second means of summation preferably provided for the device in accordance with the invention. In this diagram a current rate of change ROC2 of second signal S2 determined by the means for determining rates of change shown in FIG. 4 is fed to second means of summation 24. Furthermore earlier rates of change ROC2W2, ROC2W3, ROC2W4, ROC2W5, ROC2W6, ROC2W7 and ROC2W8 of the second signal S2 provided by the relevant delay means 74 to 86 are fed to the second means of summation 24. The second means of summation 24 delivers the second rate of change sum ROC2S which can also be designated as a sliding average value.

Figure 9:
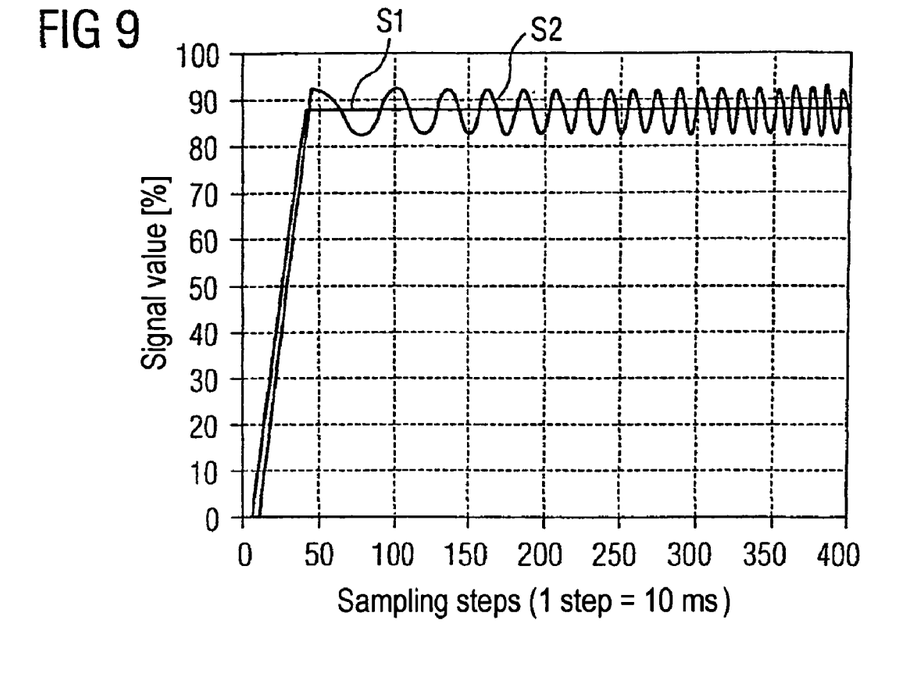
FIG. 9 a graph typically illustrating a possible curve of the first signal and the second signal.

FIG. 9 shows a graph which for example illustrates a typical curve of the first signal and of the second signal, in which case the curve S1 designates the curve of the first signal and the curve S2 reproduces the curve of the second signal. It can be seen from the illustration in FIG. 9 that the second signal S2 is delayed by four sampling steps compared to the first signal S1. Furthermore the second signal S2 exhibits a sine-wave additive fault with rising frequency.

Figure 10:
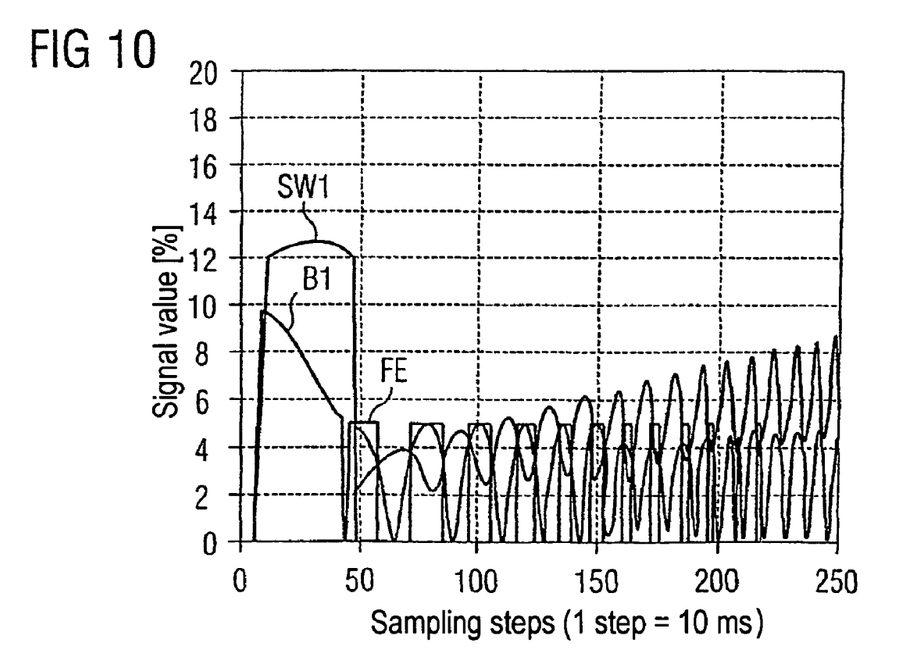
FIG. 10 a graph which, for the curve of the first signal and the second signal in accordance with FIG. 9, illustrates the adaptation of the first threshold value, the amount of the difference between the value of the first signal and the value of the second signal and an error signal which shows when the signal difference lies above the relevant diagnosis threshold.

FIG. 10 shows a graph which, for the curve of the first signal and the second signal in accordance with FIG. 9, illustrates the adaptation of the first threshold value, the amount of the difference between the value of the first signal and the value of the second signal and an error signal which shows when the signal difference lies above the relevant diagnosis threshold, with the curve SW1 reproducing the curve of the first threshold value while the curve B1 reproduces the amount of the difference of the first signal S1 and the second signal S2. The curve FE shows when the amount B1 lies above the diagnosis threshold determined in each case by the first threshold value SW1. It can be seen from the illustration in FIG. 10 that the first threshold value SW1 becomes ever greater as the frequency of the fault increases, which is also caused by the fact that the rate of change of the first signal and of the second signal increases. The curve shown in FIG. 10 for example can be produced by the form of embodiment of the method in accordance with the invention explained on the basis of FIG. 1. It can be seen that faults are less easily able to be detected as the signal frequency increases.

Figure 11:
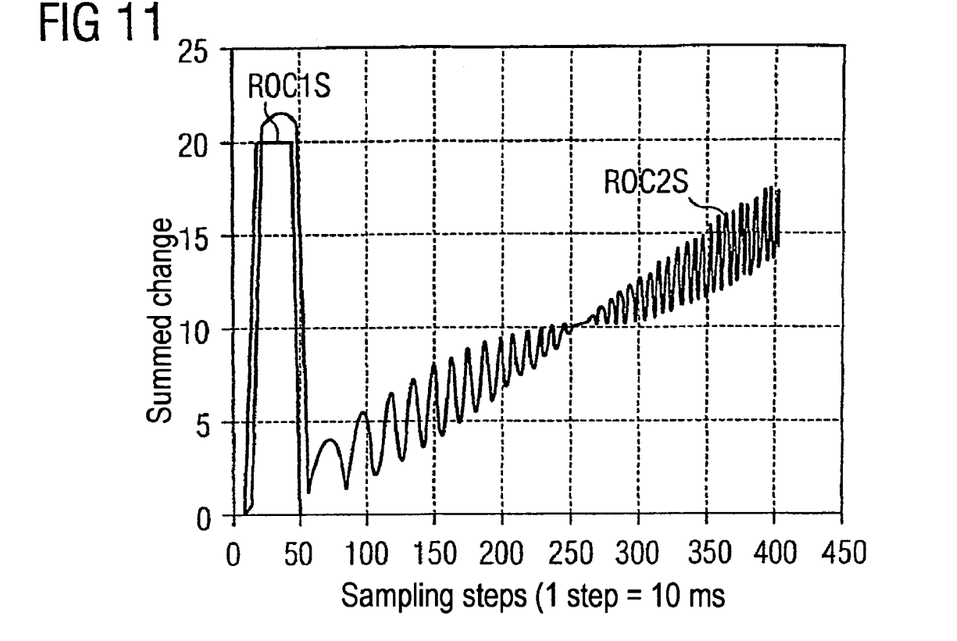
FIG. 11 a graph which, for the curves of the first signal and the second signal in accordance with FIG. 9, illustrates the output signal of the first summation means and the second summation means.

FIG. 11 shows a graph which, for the curves of the first signal and the second signal in accordance with FIG. 9, illustrates the output signal of the first summation means and the second summation means. In this diagram the curve ROC1S indicates the first rate of change sum while the curve ROC2S indicates the second rate of change sum. The illustration in FIG. 11 corresponds to a sliding average formed over 8 sampling steps of the first signal S1 of the second signal S2 respectively. The first rate of change sum ROC1S returns to 0 after 50 sampling steps, while the second rate of change sum ROC2S becomes ever larger as the signal frequency rises.

Figure 12:
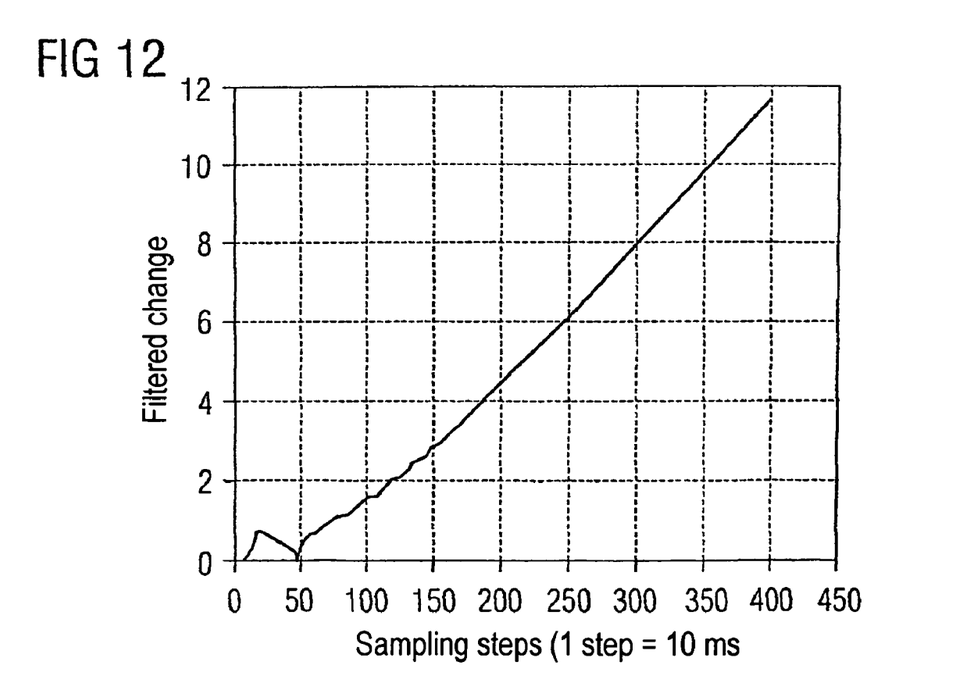
FIG. 12 a graph, which for the curves of the first signal and the second signal in accordance with FIG. 9, illustrates the amount of the low pass filtered difference between the first rate of change sum and second rate of change sum.

FIG. 12 shows a graph, which for the curves of the first signal and the second signal in accordance with FIG. 9, illustrates the amount of the low pass filtered difference between the first rate of change sum and second rate of change sum. It can be seen from the illustration in FIG. 12 that the filtered value FW continues to increase as the frequency of the input signals rises. Error detection, particularly of high frequency faults, is possible by a subsequent comparison with the second threshold value.

The features of the invention disclosed in this description, in the drawings and in the claims can be of importance both individually and in any combination for implementing the invention.

We claim:

1. A method for diagnosis of at least two sensor signals, comprising the steps of:
   receiving a first signal and at least an equivalent value second signal, and
   at least when the second signal exhibits a time delay compared to the first signal, taking into account a previous curve of the first signal and/or a previous curve of the second signal, wherein the process of taking account of the previous timing curve of the first signal includes determining a rate of change of the first signal, and the process of taking account of the previous timing curve of the second signal includes determining a rate of change of the second signal, wherein the amount of the difference between a value of the first signal and a value of the second signal is compared with a first adaptive threshold value, wherein the adaptation of the first threshold value is undertaken depending on the rate of change of the first signal and/or depending on the rate of change of the second signal.

2. The method in accordance with claim 1, wherein the rate of change of the first signal is determined by determining the amount of the difference between a first value of the first signal and an earlier second value of the first signal.

3. The method in accordance with claim 1, wherein the rate of change of the second signal is determined by determining the amount of the difference between a first value of the second signal and an earlier second value of the second signal.

4. The method in accordance with claim 1 wherein, for adaptation of the first threshold value, the sum of the rate of change maxima determined at different points in time and if necessary of a constant is determined.

5. A device for diagnosis of a pedal travel sensor arrangement of a motor vehicle, which delivers a first signal and at least one second equivalent signal wherein at least when the second signal exhibits a time delay compared to the first signal, the device takes account of a previous curve of the first signal and/or a previous curve of the second signal, wherein the device comprises first means for determining a rate of change of the first signal to take account of the previous time curve of the first signal, second means for determining a rate of change of the second signal to take account of the previous timing curve of the second signal, first comparison means which compare the amount of the difference between a value of the first signal and a value of the second signal with a first threshold value, threshold value adaptation means which adapt the first threshold value, wherein the threshold adaptation means adapt the first threshold depending on the rate of change of the first signal and/or depending on the rate of change of the second signal.

6. The device in accordance with claim 5, wherein the first means of determining the rate of change determines the rate of change of the first signal by determining the amount of the difference from a first value of the first signal and an earlier second value of the first signal.

7. The device in accordance with claim 5, wherein the second means for determining that rate of change determines the rate of change of the second signal by determining the amount of the difference between a first value of the second signal and an earlier second value of the second signal.

8. The device in accordance with claim 5, wherein the means for adapting the threshold value, to adapt the first threshold value, determine the sum of the different rate of change maxima determined at different points in time and if necessary of a constant.

9. A method for diagnosis of at least two sensor signals, comprising the steps of:
   receiving a first signal and at least an equivalent value second signal, and
   at least when the second signal exhibits a time delay compared to the first signal, taking into account a previous curve of the first signal and/or a previous curve of the second signal, wherein the process of taking account of the previous timing curve of the first signal includes determining a rate of change of the first signal, and the process of taking account of the previous timing curve of the second signal includes determining a rate of change of the second signal, wherein a filtered value determined depending on the previous curve of the first signal and/or on the previous curve of the second signal, is compared with a second threshold value, and wherein determining the filtered value includes a process by which a first rate of change sum is determined from a rate of change of the first signal determined at a first point in time and one or more rates of change of the first signal determined before the first point in time.

10. The method in accordance with claim 9, wherein the second threshold value is specified as a fixed value.

11. The method in accordance with claim 9, wherein determining the filtered value includes a process by which the difference between the first rate of change sum and the second rate of change sum is determined.

12. The method in accordance with claim 11, wherein determining the filtered value includes a process by which the difference between the first rate of change sum and the second rate of change sum is subjected to low pass filtering.

13. The method in accordance with claim 12, wherein determining the filtered value includes a process by which the amount of the low pass filtered difference between the first rate of change sum and the second rate of change sum is formed.

14. A method for diagnosis of at least two sensor signals, comprising the steps of:
   receiving a first signal and at least an equivalent value second signal, and
   at least when the second signal exhibits a time delay compared to the first signal, taking into account a previous curve of the first signal and/or a previous curve of the second signal, wherein the process of taking account of the previous timing curve of the first signal includes determining a rate of change of the first signal, and the process of taking account of the previous timing curve of the second signal includes determining a rate of change of the second signal, wherein a filtered value determined depending on the previous curve of the first signal and/or on the previous curve of the second signal, is compared with a second threshold value, and wherein determining the filtered value includes a process by which a second rate of change sum from a rate of change of the second signal determined at a second point in time and one or more rates of change of the second signal determined before the second point in time.

15. A device for diagnosis of a pedal travel sensor arrangement of a motor vehicle, which delivers a first signal and at least one second equivalent signal wherein at least when the second signal exhibits a time delay compared to the first signal, the device takes account of a previous curve of the first signal and/or a previous curve of the second signal, wherein the device comprises:

first means for determining a rate of change of the first signal to take account of the previous time curve of the first signal,     second means for determining a rate of change of the second signal to take account of the previous timing curve of the second signal,     means of comparison which compares a filtered value determined depending on the previous curve of a first signal and/or the previous curve of the second signal with a second threshold value, and     means of summation which, to determine the filtered value, determines a first rate of change sum from a rate of change of the first signal determined at a first point in time and one or more rates of change of the first signal determined before the first point in time.

16. The device in accordance with claim 15, comprising means of storing threshold values which specifies the second threshold value as a fixed value.

17. The device in accordance with claim 15, comprising subtraction means, which, to determine the filtered value, determine the difference between the first rate of change sum and the second rate of change sum.

18. The device in accordance with claim 17, comprising means of low pass filtering, which, to determine the filtered value, apply low pass filtering to the difference between the first rate of change sum and the second rate of change sum.

19. The device in accordance with claim 18, comprising means for forming the amount which, to determine the filtered value, determines the amount of the low pass filtered difference between the first rate of change sum and the second rate of change sum.

20. A device for diagnosis of a pedal travel sensor arrangement of a motor vehicle, which delivers a first signal and at least one second equivalent signal wherein at least when the second signal exhibits a time delay compared to the first signal, the device takes account of a previous curve of the first signal and/or a previous curve of the second signal, wherein the device comprises:

first means for determining a rate of change of the first signal to take account of the previous time curve of the first signal,     second means for determining a rate of change of the second signal to take account of the previous timing curve of the second signal,     means of comparison which compares a filtered value determined depending on the previous curve of a first signal and/or the previous curve of the second signal with a second threshold value, and     means of summation which, to determine the filtered value, determines a second rate of change sum from a rate of change of the second signal determined at a first point in time and one or more rates of change of the second signal determined before the second point in time.

\* \* \* \* \*